United States Patent [19]

Morinaga et al.

[11] Patent Number: 4,643,986

[45] Date of Patent: Feb. 17, 1987

[54] PROCESS FOR PREPARING A CATALYST FOR POLYMERIZATION OR COPOLYMERIZATION OF ETHYLENE

[75] Inventors: Hiroshi Morinaga, Yotsukaido; Sakae Kamiyama; Yuzo Sato, both of Ichihara, all of Japan

[73] Assignee: Nissan Chemical Industries Ltd., Tokyo, Japan

[21] Appl. No.: 847,473

[22] Filed: Apr. 3, 1986

[30] Foreign Application Priority Data

Apr. 12, 1985 [JP] Japan .................................. 60-77963

[51] Int. Cl.$^4$ .............................................. C08F 4/64
[52] U.S. Cl. .................................. 502/104; 502/116; 526/128
[58] Field of Search ............................... 502/104, 116

[56] References Cited

U.S. PATENT DOCUMENTS 3,907,759  9/1975  Okada et al. .................... 502/116 X
4,525,557  6/1985  Heilman et al. ................. 502/116 X

FOREIGN PATENT DOCUMENTS 2350196  4/1974  Fed. Rep. of Germany ...... 502/116

Primary Examiner—Patrick P. Garvin
Attorney, Agent, or Firm—Oblon, Fisher, Spivak, McClelland & Maier

[57] ABSTRACT

A process for preparing a catalyst for polymerization or copolymerization of ethylene, which comprises reacting a silicone compound (I) of the formula $R^4{}_aH_bSiO_{(4-a-b)/2}$ or $R^5{}_nSi(OH)_{4-n}$ or a condensate thereof and an organomagnesium compound (II) of the formula $(MgR^6{}_2)_p \cdot (R^6MgX)_q$ to obtain a product (A), reacting the product (A) with a titanium compound (III) of the formula $Ti(OR^2)_mX_{4-m}$ and a silicone halide compound (IV) of the formula $R^1{}_LSiX_{4-L}$ to obtain a product (B), reacting the product (B) with an organoaluminum halide compound (V) of the formula $R^3{}_cAlX_{3-c}$ to obtain a solid component (C), and bringing the solid component (C) in contact with an organoaluminum compound (VI) of the formula $R_dAlY_{3-d}$.

4 Claims, No Drawings

PROCESS FOR PREPARING A CATALYST FOR POLYMERIZATION OR COPOLYMERIZATION OF ETHYLENE

The present invention relates to a process for preparing a catalyst for polymerization or copolymerization of ethylene. More particularly, the catalyst prepared by the process of the present invention has high catalytic activities, and the resulting polymer has a wide molecular weight distribution, a high bulk density and a uniform particle size.

The present inventors have previously proposed catalysts for the polymerization and copolymerization of ethylene in U.S. Pat. No. 4,223,118 and in Japanese Unexamined Patent Publication No. 106811/1985 published on June 12, 1985.

In the polymerization of ethylene or in the copolymerization of ethylene with a small amount of other α-olefin, the following conditions must be satisfied.

a. The catalyst is highly active, whereby a step of removal of the catalyst can be omitted, the quality of the polymer can be ensured, and the installation cost of the plant can be reduced.

b. The resulting polymer has good powder properties i.e. a uniform particle size and a large bulk density whereby the industrial handling can be facilitated, for example, the slurry polymerization can be conducted by a continuous operation for a long period of time.

c. The resulting polymer has a wide molecular weight distribution. In various fields of application of polyethylene, particularly in the fields of extrusion molding and hollow molding, if the molecular weight distribution of the polymer is narrow, the extrusion rate during the molding will be low, and accordingly the production efficiency will be low. Further, the molded product tends to have a rough surface such as a shark skin, streaks or pittings, or an uneven wall thickness.

The present inventors have previously proposed highly active catalysts capable of forming a polyethylene having a wide molecular weight distribution. Namely, U.S. Pat. No. 4,223,118 discloses a catalytic activity for the production of polyethylene being from 21 to 147 kg/g.Ti.hr, and Japanese Unexamined Patent Publication No. 106811/1985 discloses a catalytic activity of from 194 to 531 kg/g.Ti.hr.

Further, for continuous slurry polymerization, it is necessary to ensure an efficient continuous operation for a long period of time. For this purpose, it is desired that the resulting polymer has a high bulk density and a uniform particle size, and there is no formation of fine polymer particles.

In this respect, in U.S. Pat. No. 4,223,118, the bulk density of the formed polyethylene is as high as from 0.275 to 0.330, and Log $\sigma$ (particle size distribution) is at a level of 0.13. Further, in Japanese Unexamined Patent Publication No. 106811/1985, the bulk density is from 0.15 to 0.16, and Log $\sigma$ is at a level of 0.20.

As a practical evaluation standard for the molecular weight distribution, a flow ratio (FR) is commonly employed. This FR is represented by the ratio of the flow amounts of a molten polymer under different extrusion pressures. For instance, according to the method of ASTM-D-1238-65T, FR is represented by the ratio of $MI_{10}/MI_2$ where $MI_2$ is the melt index as measured at a temperature of 190° C. under a load of 2.16 kg and $MI_{10}$ is the melt index as measured at a temperature of 190° C. under a load of 10.0 kg.

Generally, in the fields of extrusion molding and hollow molding, FR is preferably at least 12, when $MI_2$ is from 0.1 to 0.4.

In this respect, FR of the polyethylene in U.S. Pat. No. 4,223,118 is at a level of from 14.2 to 16.8, and FR in Japanese Unexamined Patent Publication No. 106811/1985, is at a level of from 12.4 to 14.7.

From the foregoing, it should be evident that in U.S. Pat. No. 4,223,118, the bulk density and the molecular weight distribution of the formed polyethylene are at a satisfactory level, but the catalytic activities are required to be further improved.

Whereas, in Japanese Unexamined Patent Publication No. 106811/1985, the catalytic activities and the molecular weight distribution of the formed polyethylene are generally satisfactory, but no substantial improvement in the bulk density is observed.

The present inventors have conducted extensive researches on the preparation of catalysts and on various physical properties of polymers to overcome the above-mentioned problems on the basis of U.S. Pat. No. 4,223,118 and Japanese Unexamined Patent Publication No. 106811/1985, and have finally accomplished the present invention.

The present invention provides a process for preparing a catalyst for polymerization or copolymerization of ethylene, which comprises reacting a silicone compound (I) and an organomagnesium compound (II) to obtain a product (A), reacting the product (A) with a titanium compound (III) and a silicone halide compound (IV) to obtain a product (B), reacting the product (B) with an organoaluminum halide compound (V) to obtain a solid component (C), and bringing the solid component (C) in contact with an organoaluminum compound (VI), wherein:

(1) said silicone compound (I) is at least one member selected from the group consisting of a hydropolysiloxane compound of the formula $R^4_a H_b SiO_{(4-a-b)/2}$ where $R^4$ is a monovalent organic group selected from the group consisting of an alkyl group, an aryl group, an aralkyl group, an alkoxy group and an aryloxy group, a is an integer of from 0 to 2, and b is an integer of from 1 to 3, provided that $a+b \leq 3$, a compound of the formula $R^5_n Si(OH)_{4-n}$ wherein $R^5$ is a monovalent hydrocarbon group having from 1 to 18 carbon atoms and n is an integer of from 1 to 3, and a condensate thereof;

(2) said organomagnesium compound (II) is a compound of the formula $(MgR^6_2)_p \cdot (R^6 MgX)_q$ wherein $R^6$ is a hydrocarbon group, X is a halogen atom, and each of p and q is a number of from 0 to 1, provided that $p+q=1$;

(3) said titanium compound (III) is a compound of the formula $Ti(OR^2)_m X_{4-m}$ wherein $R^2$ is a hydrocarbon group having from 1 to 12 carbon atoms, X is a halogen atom, and m is a number of from 0 to 4;

(4) said silicone halide compound (IV) is a compound of the formula $R^1_L SiX_{4-L}$ wherein $R^1$ is a hydrogen atom or a hydrocarbon group having from 1 to 8 carbon atoms, X is a halogen atom and L is a number of from 0 to 3;

(5) said organoaluminum halide compound (V) is a compound of the formula $R^3_c AlX_{3-c}$ wherein $R^3$ is a hydrocarbon group having from 1 to 12 carbon atoms, X is a halogen atom, and c is a number of from 1 to 2; and (6) the organoaluminum compound (VI) is a compound of the formula $R_d AlY_{3-d}$ wherein R is a monovalent hydrocarbon group, Y is a hydrogen atom, a halogen atom or an alkoxy group, and d is a number of from 1 to 3.

Namely, the present invention is based on a discovery that the catalyst obtained by the above process has well balanced properties with respect to the three requirements of the catalytic activities, the powder properties and the molecular weight distribution of the resulting polymer.

Now, the present invention will be described in detail with reference to the preferred embodiments.

The silicone compound (I) to be used in the preparation of the reaction product (A) of the present invention may be a hydropolysiloxane compound of the formula (1):

$$R^4{}_aH_bSiO_{(4-a-b)/2} \qquad (1)$$

wherein $R^4$ is a molvalent organic group selected from an alkyl group, an aryl group, an aralkyl group, an alkoxy group and an aryloxy group, a is an integer of from 0 to 2, and b is an integer of from 1 to 3, provided that $a+b \leq 3$. There is no particular restriction as to the degree of polymerization, and either a liquid compound or a solid compound may be used.

Further, the terminals of the hydropolysiloxane compound may be substituted by any optional inert groups such as a trialkylsilyl groups.

As specific examples of the hydropolysiloxane compound of the formula (1), there may be mentioned tetramethyldisiloxane, diphenyldisiloxane, trimethylcyclotrisiloxane, tetramethylcyclotetrasiloxane, methylhydropolysiloxane, phenylhydropolysiloxane, ethoxyhydropolysiloxane, cyclooctylhydropolysiloxane and chlorophenylhydropolysiloxane. The silicone compound (I) may also be a compound of the formula (2):

$$R^5{}_nSi(OH)_{4-n} \qquad (2)$$

wherein $R^5$ is a monovalent hydrocarbon group having from 1 to 18 carbon atoms, such as an alkyl group, a cycloalkyl group, an aralkyl group, an aryl group and an alkaryl group, which may be a straight chain, branched chain, saturated, unsaturated or cyclic. When a plurality of $R^5$ are present, they may be the same or different. n is an integer from 1 to 3, wherein an organic group and a hydroxy group are bonded to a silicone atom, and a condensate thereof.

As specific examples of the compound of the formula (2) wherein an organic group and a hydroxyl group are bonded to a silicone atom, there may be mentioned butyltrihydroxysilane, phenyltrihydroxysilane, trimethylhydroxysilane, triethylhydroxysilane, triphenylhydroxysilane, methyldiphenylhydroxysilane and benzyldiphenylhydroxysilane.

Further, as examples of the polysiloxane-type compound having a siloxane (Si—O—Si) linkage as the condensate of the compound of the formula (2) wherein an organic group and a hydroxy group is bonded to a silicone atom, there may be mentioned α,ω-dihydroxydimethylpolysiloxane and α,ω-dihydroxymethylphenylpolysiloxane.

Namely, the silicone compound (I) to be used in the present invention, is optionally selected from the group consisting of the hydroxysiloxane compound of the formula (1), the compound of the formula (2) wherein an organic group and a hydroxy group are bonded on a silicone atom, and a condensate of the compound of the formula (2), and it is not restricted to one compound and may be a mixture of two or more different compounds. Further, it may not necessarily be pure.

The organic magnesium compound (II) to be used for the preparation of the reaction product (A) of the present invention is a compound of the formula:

$$(MgR^6{}_2)_p\cdot(R^6MgX)_q$$

wherein $R^6$ is a hydrocarbon group, X is a halogen atom, and each of p and q is a number of from 0 to 1, provided that $p+q=1$, or an ether complex thereof.

As specific examples of the organomagnesium compound (II), there may be mentioned a Grignard reagent in a narrow sense represented by the formula $R^6MgX$, and a dihydrocarbyl magnesium represented by the formula $MgR^6{}_2$.

For the production of the reaction product (A) from the hydropolysiloxane compound of the formula (1) as the silicone compound (I) and the organomagnesium compound (II), the molar ratio of $R^6Mg/Si$ is adjusted to be within a range of from 0.05 to 1, and the compound of the formula (I) is added under stirring to the organomagnesium compound (II). The reaction is preferably conducted at a temperature of from 50° to 100° C. for a reaction time of from 1 to 5 hours. After the addition of the compound of the formula (I), the stirring is preferably continued for a certain period of time to complete the reaction.

For the preparation of the reaction product (A) from the compound of the formula (2) wherein an organic group and a hydroxy group are bonded to a silicone atom and the organomagnesium compound (II), the molar ratio of $R^6Mg$ of the organomagnesium compound (II) to OH of the compound of the formula (2) or its condensate is adjusted to be $R^6Mg/OH=0.05$ to 1, and the compound of the formula (2) or its condensate is added under stirring to the organomagnesium compound (II). The reaction is preferably conducted at a temperature of from $-50°$ to 100° C. for a reaction time of from 30 minutes to 5 hours. After the addition of the compound of the formula (2) or its condensate, the stirring is preferably continued for a certain period of time to complete the reaction.

The titanium compound (III) to be used for the preparation of the reaction product (B) of the present invention is a compound represented by the formula:

$$Ti(OR^2)_mX_{4-m}$$

wherein $R^2$ is a hydrocarbon group having from 1 to 12 carbon atoms, X is a halogen atom, and m is a number of from 0 to 4. Specific examples include tetramethoxytitanium, tetraethoxytitanium, tetrapropoxytitanium, tripropoxychlorotitanium, butoxytrichlorotitanium, dibutoxydichlorotitanium, tributoxychlorotitanium, titanium tetrachloride and titanium tetrabromide.

The silicone halide compound (IV) to be used for the preparation of the reaction product (B) of the present invention is a compound represented by the formula:

$$R^1{}_LSiX_{4-L}$$

wherein $R^1$ is a hydrogen atom or a hydrocarbon group having from 1 to 8 carbon atoms, X is a halogen atom, and L is a number of from 0 to 3. Specific examples of the compound include silicone tetrachloride, silicone tetrabromide, trichlorosilane, trichloromethylsilane, trichloroethylsilane, trichloro-n-propylsilane, trichlorophenylsilane, dichlorodimethylsilane, dichlorodiethylsilane and trimethylchlorosilane.

These reaction conditions are important for the preparation of a solid component (C) for a catalyst of the present invention wherein three essential properties i.e. the catalytic activity, the powder properties and the molecular weight distribution of the resulting polymer, are well balanced.

The reaction product (B) may be prepared by any one of the following three methods.

(a) A method wherein the product (A) is reacted with the titanium compound (III), and then the silicone halide compound (IV) is reacted.

(b) A method wherein the product (A) is reacted with the silicone halide compound (IV), and then the titanium compound (III) is reacted.

(c) A method wherein the titanium compound (III) is reacted with the silicone halide compound (IV), and then the product (A) is reacted.

With respect to the proportions of the reaction product (A), the titanium compound (III) and the silicone halide compound (IV), the amount of the titanium compound (III) is usually from 0.01 to 0.5 mol, preferably from 0.05 to 0.3 mol, per 1 g atom of Mg in the product (A). If the amount of the titanium compound (III) is outside this range, the catalytic activities will be poor, and a polymer having excellent powder properties can not be obtained.

Likewise, the amount of the silicone halide compound (IV) is usually from 0.1 to 5 mols, preferably from 0.5 to 2 mols, per 1 g atom of Mg in the product (A). If the amount of the silicone halide compound (IV) is smaller than this range, a polymer having excellent powder properties is hardly obtainable.

The reaction is conducted at a temperature of from 30° to 70° C. for a reaction time of from 30 minutes to 3 hours.

The reaction is usually conducted in an inert hydrocarbon solvent. It is particularly preferred to conduct the reaction in an aromatic or halogenated aromatic hydrocarbon solvent such as benzene, toluene or chlorobenzene.

The organoaluminum halide compound (V) to be used for the preparation of the solid component (C) of the present invention is a compound represented by the formula:

$$R^3_c AlX_{3-c}$$

wherein $R^3$ is a hydrocarbon group having from 1 to 12 carbon atoms, X is a halogen atom, and c is a number of from 1 to 2. Specific examples of the compound includes dimethylaluminum chloride, methylaluminum dichloride, diethylaluminum chloride, ethylaluminum dichloride and butylaluminum dichloride.

The amount of the organoaluminum halide compound (V) is usually from 1 to 10 mols, preferably from 2 to 6 mols, per 1 g atom of Mg in the product (A). If the amount of the organoaluminum halide compound (V) is too small, the catalytic activities will be poor, and a polymer having a wide molecular weight distribution can not be obtained.

The reaction is conducted usually at a temperature of from 30° to 100° C. for a reaction time of from 30 minutes to 5 hours.

The above reaction is usually conducted in an inert hydrocarbon solvent. It is particularly preferred to conduct the reaction in an aromatic or halogenated aromatic hydrocarbon solvent such as benzene, toluene or chlorobenzene.

After the completion of the reaction, the reaction product is subjected to filtration, and soluble components are washed off by an inert hydrocarbon solvent such as hexane, heptane or kerosine to obtain a solid component (C).

The solid component (C) is used together with an organoaluminum compound (VI) as a cocatalyst for the polymerization or copolymerization of ethylene.

The organoaluminum compound (VI) to be used in the present invention is a compound represented by the formula:

$$R_d AlY_{3-d}$$

wherein R is a monovalent hydrocarbon group, Y is a hydrogen atom, a halogen atom or an alkoxy group, and d is a number of from 1 to 3. Specific examples of the compound include trimethylaluminum, triethylaluminum, tributylaluminum, diethylaluminum chloride, dibutylaluminum chloride, ethylaluminum sesquichloride, diethylaluminum hydride, dibutylaluminum hydride and diethylaluminum ethoxide.

The catalyst of the present invention useful for polymerization or copolymerization of ethylene can readily be prepared by bringing the solid component (C) in contact with the organoaluminum compound (VI).

The preferred proportion of the two components for the ethylene polymerization or copolymerization catalyst are such that Al in the organoaluminum compound (VI) is from 1 to 1000 g atoms per 1 g atom of Ti in the catalyst.

The polymerization or copolymerization of ethylene according to the present invention may be conducted in the same manner as the case in which a usual Ziegler catalyst is employed, and may be conducted either in a liquid phase or in a gaseous phase. Further, the polymerization reaction may be conducted in more than two steps under different reaction conditions.

When the polymerization reaction is conducted in a liquid phase, the catalyst of the present invention may be dispersed in a suitable inert hydrocarbon solvent such as hexane, heptane or kerosine, and the polymerization reaction can readily be conducted by introducing ethylene thereto. The polymerization temperature is usually from 30° to 200° C., preferably from 60° to 100° C. The polymerization pressure is preferably from the atmospheric pressure to 50 kg/cm². In such a case, the organoaluminum compound (VI) is used in an amount of from 0.05 to 50 mmol, preferably from 0.1 to 10 mmol per liter of the solvent.

The molecular weight of the polymer formed by the catalyst of the present invention may be controlled by adjusting the polymerization temperature, the amount of the catalyst and the addition of hydrogen to the polymerization system. The addition of hydrogen is the most effective controlling method.

The catalyst of the present invention is useful for the polymerization of ethylene and the copolymerization of ethylene with not more than about 10% by weight of other α-olefin such as propylene, butene-1, hexene-1 or octene-1.

The catalyst of the present invention provides the following advantageous.

(a) Catalytic activities

The catalytic activities in both the homopolymerization and copolymerization of ethylene, are represented by the production of the polymer of from 212 to 449 kg/Ti.g.hr, which are sufficient for a highly active catalyst.

(b) Powder properties of the resulting polymer

The bulk specific gravity of the ethylene homopolymer or copolymer is within a range of from 0.290 to 0.315.

Further, the particle size distribution (Log $\sigma$) is very narrow at a level of from 0.08 to 0.10, and the content of the polymer having a particle size of 105 $\mu$m or less is extremely small at a level of not higher than about 2% by weight.

Being such an excellent powder, the polymer can easily be handled on an industrial scale. For instance, the slurry polymerization can be conducted by a continuous operation for a long period of time.

(c) Molecular weight distribution (FR) of the resulting polymer

FR of the ethylene homopolymer or copolymer is within a range of from 12.0 to 14.7. Thus, the molecular weight distribution is wide.

In Comparative Example 1, FR and the bulk density are small, and in Comparative Example 2, the bulk density is small and the particle size distribution is large. Further, in Comparative Examples 3 and 4, the catalytic activities are very poor.

Thus, the catalyst of the present invention is well balanced with respect to the catalytic activities, the powder properties and the molecular weight distribution.

Now, the present invention will be described in further detail with reference to Examples. However, it should be understood that the present invention is by no means restricted by these specific Examples.

In the following Examples, various properties were measured in accordance with the following methods.

MI$_2$: ASTM-D-1238-65T
  Melt index at a temperature of 190° C. under a load of 2.16 kg
MI$_{10}$: ASTM-D-1238-65T
  Melt index at a temperature of 190° C. under a load of 10.0 kg
FR: Flow ratio (MI$_{10}$/MI$_2$)
Bulk density: JIS K-6721-1966
Particle size distribution:
  50 g of a polymer was shaked for 15 minutes by a Ro-Tap model shaking machine using 11 different types of sieves covering from 16 to 250 mesh, and classified to obtain the particle size distribution.
Breadth of the particle size distribution:
  Dust collector, published by Nikkan Kogyo Shinbun, pages 15–80, 1965 $\sigma$ represents a geometrical standard deviation in the logarithmic distribution probability formula. The smaller the value of Log $\sigma$, the narrower the particle size distribution.

EXAMPLE 1

(1) Preparation of solid component (C)

Into a glass reactor with its inside preliminarily thoroughly dried and flushed with nitrogen, 300 ml of a tetrahydrofuran solution of n-butylmagnesium chloride (0.670 mol) was charged, and 42.0 ml of methylhydropolysiloxane with its terminals substituted by trimethylsilyl groups (Si: 0.7 g atom, viscosity: about 30 centistokes at 25° C.) was dropwise added thereto under stirring and cooling. After the addition of the total amount, the mixture was stirred at 70° C. for 1 hour, and then cooled to room temperature to obtain a dark brown transparent solution. To this solution, 400 ml of toluene was added, and then, 480 ml of a mixture of tetrahydrofuran and toluene was distilled off under a reduced pressure of from 160 to 170 mmHg. Then, 480 ml of toluene was added, and 480 ml of a mixture of tetrahydrofuran and toluene was again distilled off in a similar manner. The solution thereby obtained was diluted with toluene to obtain 495 ml of a toluene solution of a reaction product (A) (Mg: 1.35 g atom/liter).

Then, into a glass reactor with its inside preliminarily thoroughly dried and flushed with nitrogen, 40 ml of toluene and 50 ml of the toluene solution of the reaction product (A) (which contained 67.5 mg atom of Mg) were added, and the temperature was raised to 50° C. Then, 2 ml (6.7 mmol) of tetraisopropoxy titanate was charged, and the mixture was stirred for 1 hour. Then, a solution mixture of 10 ml of toluene and 7.7 ml (67.6 mmol) of silicone tetrachloride was dropwise added in 30 minutes, and the mixture was stirred at 50° C. for 1 hour to obtain a toluene solution of a reaction product (B). Then, a solution mixture of 50 ml of toluene and 28.6 ml (270.4 mmol) of ethylaluminum dichloride was dropwise added in 30 minutes, and after raising the temperature to 70° C., the mixture was stirred for 1 hour.

To the slurry thus obtained, n-hexane was added, and soluble components were filtered off. This operation was repeated six times to obtain a n-hexane slurry containing a solid component (C) (Ti: 33.5 mg atom/g).

(2) Polymerization of ethylene

Into a 1.6 liter stainless steel autoclave with its inside preliminarily thoroughly dried and flushed with nitrogen, 600 ml of n-hexane was charged, and after the temperature was raised to 60° C., 0.19 mmol of triethylaluminum and the n-hexane slurry containing 3 mg of the solid component (C) were consecutively added. Then, hydrogen was introduced under 3.0 kg/cm$^2$ (absolute pressure), and the temperature was raised to 75° C. Then, while continuously introducing ethylene, polymerization was conducted for 1 hour under a pressure of 8 kg/cm$^2$ (gauge pressure).

The product was separated from the solvent and dried to obtain 44.4 g of polyethylene as a white powder. This polyethylene had MI$_2$ of 0.316, FR of 13.0, and a bulk density of 0.310. Further, the average particle size was 283 $\mu$m, fine polyethylene having a particle size of 105 $\mu$m or less was not higher than 1% by weight, and the particle size distribution of the obtained polyethylene was extremely narrow.

The catalytic activity for the polymerization was 442 kg/g.Ti.hr.

EXAMPLE 2

(1) Preparation of solid component (C)

Into a glass reactor with its inside preliminarily thoroughly dried and flushed with nitrogen, 40 ml of toluene and 50 ml of the toluene solution of the reaction product (A) of Example 1 (which contained 67.5 mg atom of Mg) were added, and the temperature was raised to 50° C. Then, solution mixture of 10 ml of toluene and 7.7 ml (67.6 mmol) of silicone tetrachloride was dropwise added in 30 minutes. Then, the mixture was stirred for 1 hour and then cooled to room temperature. Then, toluene was added to the slurry thus obtained, and soluble components were filtered off. This operation was repeated four times. After a further addition of toluene, the temperature was raised to 50° C.

Then, 2.3 ml of tetra-n-butoxy titanate was added to obtain a reaction product (B). Then, a solution mixture of 50 ml of toluene and 43 ml of ethylaluminum dichloride, was dropwise added in 30 minutes. After the temperature was raised to 70° C., the mixture was stirred for 1 hour.

To the slurry thus obtained, n-hexane was added, and soluble components were filtered off. This operation was repeated six times to obtain a n-hexane slurry containing a solid component (C) (Ti: 50.0 mg atom/g).

(2) Polymerization of ethylene

The polymerization reaction was conducted in the same manner as in Example 1 except that the n-hexane solution containing 3 mg of the solid component (C) was used, whereby 33.9 g of polyethylene was obtained as a white powder.

The particles of this polyethylene were uniform, and the particle size distribution was narrow.

EXAMPLE 3

(1) Preparation of solid component (C)

Into a glass reactor with its inside preliminarily thoroughly dried and flushed with nitrogen, 54 ml of $\alpha,\omega$-dihydroxydimethylpolysiloxane (average degree of polymerization: 9, SiOH content: 0.146 mol) and 100 ml of toluene were charged, and 50 ml of a tetrahydrofuran solution of n-butylmagnesium chloride (0.146 mol) was gradually dropwise added under stirring and cooling. After the addition of the total amount, the mixture was stirred at 70° C. for 1 hour and cooled to room temperature to obtain a slightly white turbid transparent solution. To this solution, 400 ml of toluene was added, and the mixture was heated to distill off ½ of the liquid phase. Then, the solution thus obtained was diluted with toluene, whereby 580 ml of a toluene solution of a reaction product (A) (Mg: 0.25 g atom/liter) was obtained.

Then, into a glass reactor with its inside preliminarily thoroughly dried and flushed with nitrogen, 270 ml of the toluene solution of the reaction product (A) was added, and the temperature was raised to 50° C. To this solution, 10 ml of a toluene solution of a product obtained by adding 7.7 ml (67.6 mmol) of silicone tetrachloride and 2 ml (6.7 mmol) of tetraisopropoxy titanate to 10 ml of toluene and reacting them at 50° C. for 1 hour, was dropwise added in 30 minutes, and then the mixture was stirred at 50° C. for 1 hour to obtain a toluene solution of a reaction product (B).

Then, a solution mixture of 50 ml of toluene and 28.6 ml (270.4 mmol) of ethylaluminum dichloride, was dropwise added in 30 minutes, and after the temperature was raised to 70° C., the mixture was stirred for 1 hour.

To the slurry thus obtained, n-hexane was added, and soluble components were filtered off. This operation was repeated six times to obtain a n-hexane slurry containing a solid component (C) (Ti: 31.3 mg atom/g).

(2) Copolymerization of ethylene with butene-1

The polymerization reaction was conducted in the same manner as in Example 1 except that the n-hexane slurry containing 9 mg of the solid component (C) was used and 2 g of butene-1 was introduced, whereby 97.1 g of a polymer was obtained as a white powder.

EXAMPLES 4 TO 7

(1) Preparation of solid component (C)

A n-hexane slurry containing a solid component (C) was prepared in the same manner as in Example 1 except that the types and the proportions of the titanium compound (III), the silicone halide compound (IV) and the organoaluminum halide compound (V) were changed. The conditions are shown in Table 1.

(2) Polymerization of ethylene

The polymerization reaction of ethylene was conducted in the same manner as in Example 1 except that the n-hexane slurry containing 6 mg of the solid component (C) was used. The results are shown in Table 2.

COMPARATIVE EXAMPLE 1

(1) Preparation of a solid component

A n-hexane slurry containing a solid component (Ti: 14.3 mg atom) was prepared in the same manner as in Example 1 except that ethylaluminum dichloride was not used.

(2) Polymerization of ethylene

The polymerization reaction was conducted in the same manner as in Example 1 except that n-hexane slurry containing 6 mg of the solid component was used, and the polymerization temperature was 80° C. and hydrogen was introduced under a pressure of 1.5 kg/cm$^2$ (absolute pressure), whereby 46.8 g of polyethylene was obtained as a white powder.

COMPARATIVE EXAMPLE 2

(1) Preparation of a solid component

A n-hexane slurry containing a solid component (Ti: 40.3 mg atom/g) was prepared in the same manner as in Example 1 except that silicone tetrachloride was not used.

(2) Polymerization of ethylene

The polymerization reaction was conducted in the same manner as in Example 1 except that the n-hexane slurry containing 2.5 mg of the solid component was used, whereby 82.0 g of polyethylene was obtained as a white powder.

COMPARATIVE EXAMPLE 3

(The catalyst corresponds to U.S. Pat. No. 4,223,118)

(1) Preparation of a solid component

Into a glass reactor with its inside preliminarily thoroughly dried and flushed with nitrogen, 16.3 g of aluminum triisopropoxide and 133 ml of toluene were charged, and 59.3 ml of a toluene solution of the reaction product (A) obtained in Example 1 (which contained 80.0 mg atom of Mg) was added. The mixture was stirred at 0° C. for 30 minutes, and then 35.2 ml of titanium tetrachloride was dropwise added. Then, the mixture was reacted at 100° C. for 3 hours.

To the slurry thus obtained, n-hexane was added, and soluble components were filtered off. This operation was repeated six times to obtain a n-hexane slurry containing a solid component (Ti: 162 mg atom/g).

(2) Polymerization of ethylene

The polymerization reaction was conducted in the same manner as in Example 1 except that the n-hexane slurry containing 10 mg of the solid component and 0.5 mmol of tirisobutylaluminum were used, and the polymerization temperature was changed to 80° C., whereby 101 g of polyethylene was obtained as a white powder.

COMPARATIVE EXAMPLE 4

(The catalyst corresponds to U.S. Pat. No. 4,223,118)

(1) Preparation of a solid component

To the n-hexane slurry containing 1 g of the solid component obtained in Comparative Example 3, 5 mmol of diethylaluminum chloride was added, and the mixture was stirred at room temperature for 1 hour to obtain a n-hexane slurry containing a solid component (Ti: 162.2 mg atom/g).

(2) Polymerization of ethylene

The polymerization reaction was conducted in the same manner as in Comparative Example 3 except that the n-hexane slurry containing 8 mg of the solid component was used and hydrogen was introduced under a pressure of 3.5 kg/cm$^2$ (absolute pressure), whereby 74.5 g of polyethylene was obtained as a white powder.

COMPARATIVE EXAMPLE 5

(The catalyst corresponds to Japanese Unexamined Patent Publication No. 106811/1985.)

(1) Preparation of a solid component

Into a glass reactor with its inside preliminarily thoroughly dried and flushed with nitrogen, 44 ml of a tetrahydrofuran solution of n-butylmagnesium chloride (0.1 mol) was charged, and 6 ml of methylhydropolysiloxane with its terminals substituted by trimethylsilyl groups (Si: 0.1 g atom, viscosity: about 30 centistokes at 25° C.) was gradually dropwise added under stirring and cooling. After the addition of the total amount, the mixture was stirred at 70° C. for 1 hour, and then cooled to room temperature to obtain a dark brown transparent solution. To this solution, 0.1 mol of 2-ethylhexanol was dropwise added in 1 hour at room temperature, and then reacted for 2 hours. Then, 40 ml of n-dodecane was added. The mixture was subjected to distillation under reduced pressure at a temperature of from 50° to 60° C. to distill 60 ml of tetrahydrofuran. The operation of the addition of n-dodecane and the distillation under reduced pressure, was further repeated twice to obtain a colorless transparent n-dodecane solution of a reaction product (Mg: 0.52 g atom/liter). The amount of remaining tetrahydrofuran was 0.015 mol/Mg 0.52 g atom.

Then, into a glass reactor with its inside preliminarily thoroughly dried and flushed with nitrogen, 20 ml of n-dodecane and 10 mol of ethylaluminum dichloride were charged, and a mixture of 5 ml of n-dodecane and 10 mmol of isopropylalcohol was dropwise added at room temperature under stirring. Then, the mixture was reacted at 50° C. for 1 hour, and cooled to room temperature.

To this reaction solution, a mixture of 9.6 ml of the above colorless transparent n-dodecane solution of the reaction product (Mg: 0.52 g atom/liter) and 5 ml of n-dodecane, was dropwise added at room temperature, and the mixture was reacted at 60° C. for 1 hour and then cooled to room temperature.

Then, a mixture of 2.2 ml of titanium tetrachloride and 12 ml of n-dodecane, was dropwise added at room temperature, and the mixture was reacted at 120° C. for 2 hours. To the slurry thus obtained, n-hexane was added, and the mixture was subjected to filtration until chlorine ions were no longer observed, whereby a n-hexane slurry containing a solid component (Ti: 40.7 mg atom/g) was obtained.

To this n-hexane slurry containing the solid component, diethylaluminum chloride (2 mol/Ti 1 g atom) was added, and the mixture was reacted at room temperature for 1 hour to obtain a n-hexane slurry containing a solid component (Ti: 40.3 mg atom/g).

(2) Polymerization of ethylene

The polymerization reaction was conducted in the same manner as in Example 1 except that the n-hexane slurry containing 3 mg of the above solid component was used, whereby 51.9 g of polyethylene was obtained as a white powder. This polyethylene had MI$_2$ of 0.33, FR of 12.5, a bulk density of 0.15, and Log $\sigma$ of 0.20.

The catalytic activity was 425 kg/g.Ti.hr.

TABLE 1

| | Example 1 | Example 2 | Example 3 | Example 4 | Example 5 | Example 6 |
|---|---|---|---|---|---|---|
| Silicone halide compound | SiCl$_4$ | SiCl$_4$ | SiCl$_4$ | CH$_3$SiCl$_3$ | SiCl$_4$ | SiCl$_4$ |
| Titanium compound | Ti(O—iPr)$_4$ | Ti(O—nBu)$_4$ | Ti(O—iPr)$_4$ | Ti(O—iPr)$_4$ | Ti(O—iPr)$_4$ | TiCl$_4$ |
| Organoaluminum halide compound | EtAlCl$_2$ | EtAlCl$_2$ | EtAlCl$_2$ | EtAlCl$_2$ | EtAlCl$_2$ | EtAlCl$_2$ |
| Mg/Si/Ti/Al (atomic ratio)* | 1/1/0.1/4 | 1/1/0.1/4 | 1/1/0.1/4 | 1/1/0.1/4 | 1/1/0.05/2 | 1/1/0.1/4 |
| Ti content (mg · Ti/g · cat) | 33.5 | 50.0 | 31.3 | 32.8 | 16.9 | 42.9 |

| | Example 7 | Comparative Example 1 | Comparative Example 2 | Comparative Example 3 | Comparative Example 4 |
|---|---|---|---|---|---|
| Silicone halide compound | SiCl$_4$ | SiCl$_4$ | Nil | Nil | Nil |
| Titanium compound | Ti(O—iPr)$_2$Cl$_2$ | Ti(O—iPr)$_4$ | Ti(O—iPr)$_4$ | TiCl$_4$ | TiCl$_4$ |
| Organoaluminum halide compound | EtAlCl$_2$ | Nil | EtAlCl$_2$ | Al(O—iPr)$_3$ | Al(O—iPr)$_3$ |
| Mg/Si/Ti/Al (atomic ratio)* | 1/1/0.1/4 | 1/1/0.1/0 | 1/0/0.1/4 | 1/0/4/1 | — |
| Ti content (mg · Ti/g · cat) | 33.1 | 14.3 | 40.3 | 162.0 | — |

*Mg is the amount in the reaction product (A).

TABLE 2

| | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|
| Catalytic activity (kg/Ti · g · hr) | 442 | 226 | 345 | 375 | 449 | 212 | 335 | 545 | 814 | 62.3 | 57.4 |
| $MI_2$ | 0.316 | 0.19 | 0.435 | 0.337 | 0.480 | 0.386 | 0.563 | 0.33 | 0.34 | 0.33 | 0.31 |
| FR | 13.0 | 14.7 | 12.8 | 13.0 | 12.0 | 14.4 | 14.2 | 8.5 | 14.0 | 14.6 | 15.4 |
| Powder properties | | | | | | | | | | | |
| Bulk density | 0.310 | 0.296 | 0.309 | 0.312 | 0.301 | 0.290 | 0.315 | 0.255 | 0.207 | 0.297 | 0.330 |
| Log σ | 0.08 | — | 0.10 | — | — | — | — | — | 0.19 | — | — |
| Content of particles of 105 μm or less (wt. %) | <1 | — | 2 | — | — | — | — | — | 40 | — | — |

We claim:

1. A process for preparing a catalyst for polymerization or copolymerization of ethylene, which comprises reacting a silicone compound (I) and an organomagnesium compound (II) to obtain a product (A), reacting the product (A) with a titanium compound (III) and a silicone halide compound (IV) to obtain a product (B), reacting the product (B) with an organoaluminum halide compound (V) to obtain a solid component (C), and bringing the solid component (C) in contact with an organoaluminum compound (VI), wherein:

(1) said silicone compound (I) is at least one member selected from the group consisting of a hydropolysiloxane compound of the formula $R^4_a H_b SiO_{(4-a-b)/2}$ where $R^4$ is a monovalent organic group selected from the group consisting of an alkyl group, an aryl group, an aralkyl group, an alkoxy group and an aryloxy group, a is an integer of from 0 to 2, and b is an integer of from 1 to 3, provided that $a+b \leq 3$, a compound of the formula $R^5_n Si(OH)_{4-n}$ wherein $R^5$ is a monovalent hydrocarbon group having from 1 to 18 carbon atoms and n is an integer of from 1 to 3, and a condensate thereof;

(2) said organomagnesium compound (II) is a compound of the formula $(MgR^6_2)_p \cdot (R^6MgX)_q$ wherein $R^6$ is a hydrocarbon group, X is a halogen atom, and each of p and q is a number of from 0 to 1, provided that $p+q=1$;

(3) said titanium compound (III) is a compound of the formula $Ti(OR^2)_m X_{4-m}$ wherein $R^2$ is a hydrocarbon group having from 1 to 12 carbon atoms, X is a halogen atom, and m is a number of from 0 to 4;

(4) said silicone halide compound (IV) is a compound of the formula $R^1_L SiX_{4-L}$ wherein $R^1$ is a hydrogen atom or a hydrocarbon group having from 1 to 8 carbon atoms, X is a halogen atom and L is a number of from 0 to 3;

(5) said organoaluminum halide compound (V) is a compound of the formula $R^3_c AlX_{3-c}$ wherein $R^3$ is a hydrocarbon group having from 1 to 12 carbon atoms, X is a halogen atom, and c is a number of from 1 to 2; and (6) the organoaluminum compound (VI) is a compound of the formula $R_d AlY_{3-d}$ wherein R is a monovalent hydrocarbon group, Y is a hydrogen atom, a halogen atom or an alkoxy group, and d is a number of from 1 to 3.

2. The process according to claim 1, wherein the product (B) is obtained by reacting the product (A) with the titanium compound (III) and then reacting the silicone halide compound (IV) thereto.

3. The process according to claim 1, wherein the product (B) is obtained by reacting the product (A) with the silicone halide compound (IV) and then reacting the titanium compound (III) thereto.

4. The process according to claim 1, wherein the product (B) is obtained by reacting the titanium compound (III) with the silicone halide compound (IV) and then reacting the product (A) thereto.

* * * * *